(12) United States Patent
Meador et al.

(10) Patent No.: US 11,923,704 B2
(45) Date of Patent: Mar. 5, 2024

(54) BATTERY PACK REMAINING CHARGE BALANCING SYSTEM

(71) Applicant: Microsoft Technology Licensing, LLC, Redmond, WA (US)

(72) Inventors: James Chester Meador, Mountain View, CA (US); Daniel Tsuteh Chian, Los Altos, CA (US); Julian Arlo Binder, Redwood City, CA (US); Meera Radhakrishnan, Mountain View, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 64 days.

(21) Appl. No.: 17/687,547

(22) Filed: Mar. 4, 2022

(65) Prior Publication Data

US 2023/0283087 A1    Sep. 7, 2023

(51) Int. Cl.
| | |
|---|---|
| *H02J 7/00* | (2006.01) |
| *H01M 10/42* | (2006.01) |
| *H01M 10/44* | (2006.01) |
| *H01M 10/46* | (2006.01) |
| *H01M 10/48* | (2006.01) |

(52) U.S. Cl.
CPC ......... *H02J 7/0016* (2013.01); *H01M 10/425* (2013.01); *H01M 10/441* (2013.01); *H01M 10/46* (2013.01); *H01M 10/482* (2013.01); *H02J 7/0063* (2013.01); *H02J 7/00712* (2020.01); *H01M 2010/4271* (2013.01)

(58) Field of Classification Search
CPC .... H02J 7/0016; H02J 7/0063; H02J 7/00712; H01M 10/425; H01M 10/441; H01M 10/46; H01M 10/482; H01M 2010/4271
See application file for complete search history.

(56) References Cited

U.S. PATENT DOCUMENTS

| | | | |
|---|---|---|---|
| 5,844,824 A | 12/1998 | Newman et al. | |
| 6,741,065 B1* | 5/2004 | Ishii | B60L 58/21 320/122 |
| 9,813,993 B1 | 11/2017 | Kim et al. | |
| 9,851,803 B2 | 12/2017 | Fisher et al. | |
| 10,666,064 B2* | 5/2020 | Hennesy | H02J 7/00712 |
| 2014/0239637 A1 | 8/2014 | Sink et al. | |
| 2017/0063150 A1 | 3/2017 | Sakamoto et al. | |
| 2017/0142656 A1 | 5/2017 | Hong et al. | |
| 2017/0274282 A1 | 9/2017 | Nishi et al. | |
| 2018/0219389 A1* | 8/2018 | Binder | G06F 1/26 |

(Continued)

OTHER PUBLICATIONS

"International Search Report and Written Opinion Issued in PCT Application No. PCT/US22/052500", dated Mar. 21, 2023, 11 Pages.

(Continued)

*Primary Examiner* — Elim Ortiz
(74) *Attorney, Agent, or Firm* — Schwegman Lundberg & Woessner, P.A.

(57) ABSTRACT

A computer implemented method includes accessing a first status of a first battery pack interface coupled to a load via a first load switch and accessing a second status of a second battery pack interface coupled to the load via a second load switch. The first status and the second status are compared and the first and second load switches are controlled based on the comparing to balance remaining capacities of the first and second battery packs.

18 Claims, 6 Drawing Sheets

(56) References Cited

U.S. PATENT DOCUMENTS

| | | |
|---|---|---|
| 2020/0062140 A1 | 2/2020 | Zhou et al. |
| 2020/0373764 A1 | 11/2020 | Lee et al. |
| 2021/0066930 A1 | 3/2021 | Luo et al. |
| 2023/0163602 A1* | 5/2023 | Liu .................. H01M 10/482 320/112 |

OTHER PUBLICATIONS

"HP Z VR Backpack", Retrieved from: https://web.archive.org/web/20210816144025/https://www.hp.com/us-en/vr/vr-backpack.html, Aug. 16, 2021, 14 Pages.

Dumesnil, et al., "Design and Validation of a Dynamic Digital Ruler for Hands-Free Chronic Wound Assessment", In Proceedings of International Design Engineering Technical Conferences and Computers and Information in Engineering Conference, Aug. 2, 2015, 10 Pages.

\* cited by examiner

BATTERY PACK REMAINING CHARGE BALANCING SYSTEM

BACKGROUND

A head mounted device (HMD) may utilize one or more batteries for power. It is highly desirable for HMDs to be comfortable to wear and to have a long run time. Unfortunately, these goals are conflicting. Adding larger batteries, to increase the runtime, also increases the HMD weight, which reduces comfort. Some HMDs address this conflict by moving the power source off of the user's head, by adding a tethering cable. The cable may create other problems, such as potentially getting snagged or tangled as the user moves around. A tethering cable also reduces comfort and requires that the user carry a power source somewhere else on their body. In designing a self-contained HMD, a design trade-off must be made between comfort and run time.

SUMMARY

A computer implemented method includes accessing a first status of a first battery pack interface coupled to a load via a first load switch and accessing a second status of a second battery pack interface coupled to the load via a second load switch. The first status and the second status are compared and the first and second load switches are controlled based on the comparing to balance remaining capacities of the first and second battery packs.

DETAILED DESCRIPTION

In the following description, reference is made to the accompanying drawings that form a part hereof, and in which is shown by way of illustration specific embodiments which may be practiced. These embodiments are described in sufficient detail to enable those skilled in the art to practice the invention, and it is to be understood that other embodiments may be utilized and that structural, logical and electrical changes may be made without departing from the scope of the present invention. The following description of example embodiments is, therefore, not to be taken in a limited sense, and the scope of the present invention is defined by the appended claims.

The functions or algorithms described herein may be implemented in software in one embodiment. The software may consist of computer executable instructions stored on computer readable media or computer readable storage device such as one or more non-transitory memories or other type of hardware based storage devices, either local or networked. Further, such functions correspond to modules, which may be software, hardware, firmware or any combination thereof. Multiple functions may be performed in one or more modules as desired, and the embodiments described are merely examples. The software may be executed on a digital signal processor, ASIC, microprocessor, or other type of processor operating on a computer system, such as a personal computer, server or other computer system, turning such computer system into a specifically programmed machine.

The functionality can be configured to perform an operation using, for instance, software, hardware, firmware, or the like. For example, the phrase "configured to" can refer to a logic circuit structure of a hardware element that is to implement the associated functionality. The phrase "configured to" can also refer to a logic circuit structure of a hardware element that is to implement the coding design of associated functionality of firmware or software. The term "module" refers to a structural element that can be implemented using any suitable hardware (e.g., a processor, among others), software (e.g., an application, among others), firmware, or any combination of hardware, software, and firmware. The term, "logic" encompasses any functionality for performing a task. For instance, each operation illustrated in the flowcharts corresponds to logic for performing that operation. An operation can be performed using, software, hardware, firmware, or the like. The terms, "component," "system," and the like may refer to computer-related entities, hardware, and software in execution, firmware, or combination thereof. A component may be a process running on a processor, an object, an executable, a program, a function, a subroutine, a computer, or a combination of software and hardware. The term, "processor," may refer to a hardware component, such as a processing unit of a computer system.

Furthermore, the claimed subject matter may be implemented as a method, apparatus, or article of manufacture using standard programming and engineering techniques to produce software, firmware, hardware, or any combination thereof to control a computing device to implement the disclosed subject matter. The term, "article of manufacture," as used herein is intended to encompass a computer program accessible from any computer-readable storage device or media. Computer-readable storage media can include, but are not limited to, magnetic storage devices, e.g., hard disk, floppy disk, magnetic strips, optical disk, compact disk (CD), digital versatile disk (DVD), smart cards, flash memory devices, among others. In contrast, computer-readable media, i.e., not storage media, may additionally include communication media such as transmission media for wireless signals and the like.

A head mounted device (HMD) may contain electronics and a display or other devices that are powered by one or more batteries. A controller receives or accesses a status regarding each battery and controls at least one of discharging and charging the batteries to balance the remaining battery life by attempting to equalize the remaining capacities of the batteries to enhance overall runtime of the HMD. The capacity of a battery may be expressed in current hours, such as milliamp hours or amp hours. The capacity may be a product of the current that is drawn from the battery while the battery is able to supply a load until the voltage drops below a specified level.

The HMD may be operated in an environment wherein conditions cause one battery on one side of the HMD to discharge faster than a battery on the other side of the HMD. This may occur if a wearer user is in sunlight that is shining on one side of the HMD, creating a higher temperature. This may cause one battery to discharge faster than the other battery. Controlling battery charge and discharge to balance the remaining capacity of both batteries can extend runtimes and enhance a wearer's experience.

The controller may be configured to access a first status of a first battery pack interface coupled to a load via a first load switch. The status may include whether or not a battery is attached to the battery pack interface, and if attached, an indication of a remaining capacity of the attached battery. A second status of a second battery pack interface coupled to the load via a second load switch is also similarly accessed. The first status and the second status are used by the controller to control the first and second load switches. The control may be based on the difference between remaining capacities compared to one or more thresholds to determine which one or both batteries to selectively charge and discharge. Further control may be performed based on whether or not a battery is attached, and whether or not a charger is attached.

A block power diagram is first described, followed by multiple different state diagrams and a description of corresponding state transitions implemented by the controller based on various battery states.

Figure 1:
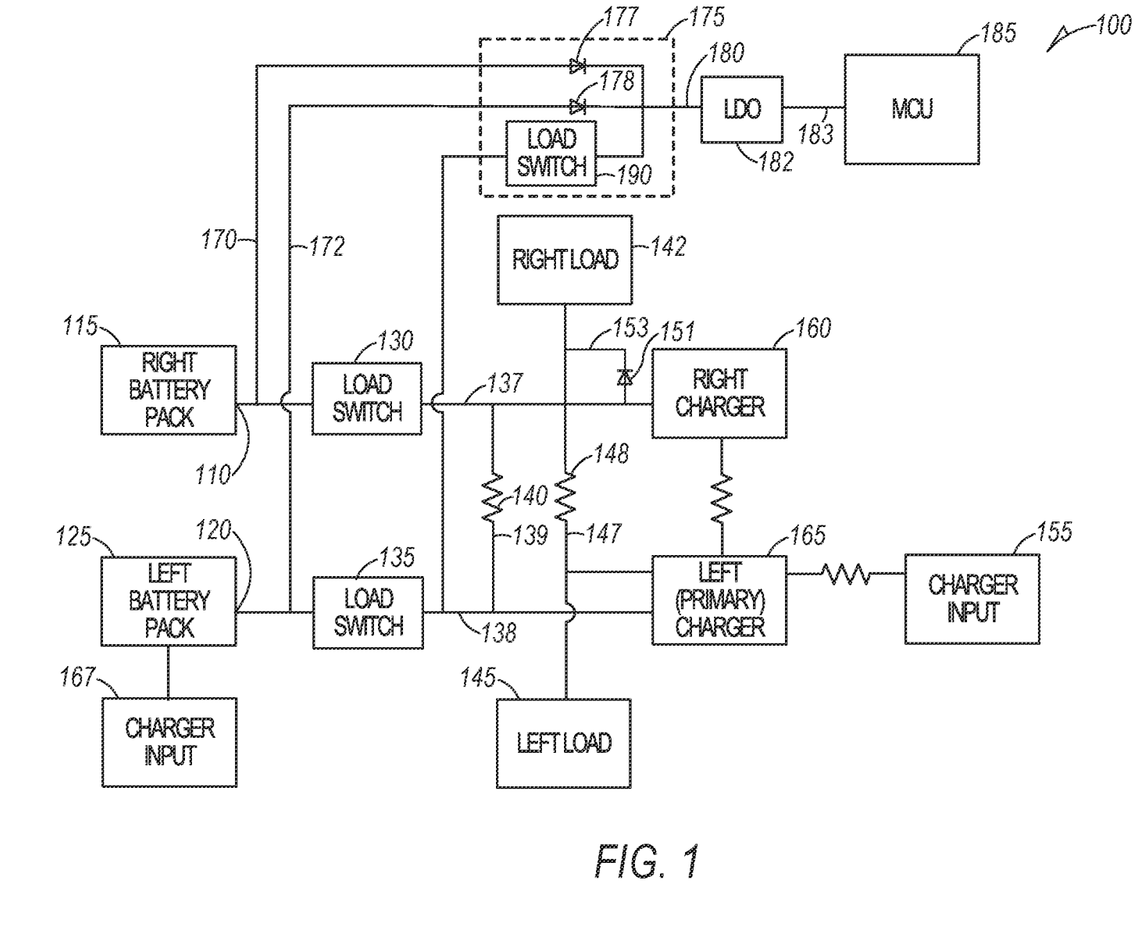
FIG. 1 is a block power diagram of a head mounted device (HMD) system showing power connections between various components according to an example embodiment.

FIG. 1 is a block power diagram of a head mounted device (HMD) system 100 showing power connections between various components. System 100 includes a right battery pack interface 110 for coupling to a right battery pack 115, and a left battery pack interface 120 for coupling to a left battery pack 125. The right and left battery pack interfaces 110 and 120 may have mechanical retention features to secure the battery packs in place, as well as electrical connections for transferring current to and from the battery packs. System 100 may accommodate more than two battery packs in further embodiments. The battery packs may be internal battery packs, external, easily replaceable battery packs, or a combination of internal and external battery packs.

The first and second battery pack interfaces 110 and 120 are coupled through respective first and second load switches 130 and 135 to at least one load via conductors 137 and 138 that are also coupled via conductor 139 having a resistance 140 of the conductor 139 between the battery packs 115 and 125. Each load switch has a first side that is coupled to a respective battery pack interface, and a second side that is coupled to conductors 137 and 138, with conductor 138 being utilized as a system power rail.

In one example, the load comprises loads 142 and 145 that are coupled via a conductor 147 having a resistance 148. A diode 151, such as an ideal diode, is used in a conductor 153 to couple conductor 137 to conductor 147, completing the connection of both loads 142 and 145 to the right and left battery packs 115 and 125 when attached to the respective battery pack interfaces 110 and 120.

System 100 may also include charging circuitry having a charger input 155. The charging circuitry may be a single circuit with outputs for charging both batteries or may be separate right and left charging circuits 160 and 165. In the example shown, left charging circuit 165 is coupled to charger input 155 and provides power to right charging circuit 160. The charging circuits having outputs coupled to conductors 137 and 138. In one example at least one of the battery packs may include a charger input as shown at 167.

In one example, charging circuit 165 may operate as a buck charger to control the voltage level on conductor 138 to desired levels if the voltage provided by the batteries is lower than desired. Diode 151 prevents current from the loads returning to the right charging circuit 160.

The right and left battery pack interfaces 110 and 120 are respectively coupled via conductors 170 and 172 to a diode based OR circuit 175. The OR circuit 175 in one example includes a respective diode 177 and 178 coupled to conductor 170 and 172 to provide an analog output on a conductor 180 to a low dropout regulator 182. Low dropout regulator 182 provides power on a line 183 to a controller 185. Power is provided in response to at least one of the battery packs being connected to a respective battery pack interface and having sufficient remaining capacity to provide a voltage higher than a low dropout regulator 183 cutoff voltage. The cutoff dropout voltage may be adjusted to be a level that provides sufficient voltage for operation of controller 185. A third load switch 190 may be coupled to conductor 180 and to conductor 138. Switch 190 may be controlled so that when the left charger 165, designated the primary charger is coupled to a source of power via charger input 155, power is supplied to controller 185 even if no battery is attached.

The controller 185 may be coupled to receive status information via the right and left battery interfaces 110 and 120, as well as remaining capacity information from the right and left battery packs 115 and 125 if connected and if they contain sufficient charge to generate charge status information. The controller 185 may also be coupled to the right and left chargers 160 and 165 to receive a status information regarding whether or not charging is available. Based on this status information, the controller is also coupled to the first and second load switches 130 and 135 to control the load switches, and hence independently control the discharge of the right and left battery packs 115 and 125.

Based on battery pack availability, remaining capacity, and balancing, the controller 185 will select which battery pack or packs to conductor 138, considered a main voltage or system power rail. Once the decision has been made the diode OR 175 will be disabled using switch 190 and the controller 185 will draw power from conductor 138.

Figure 2:
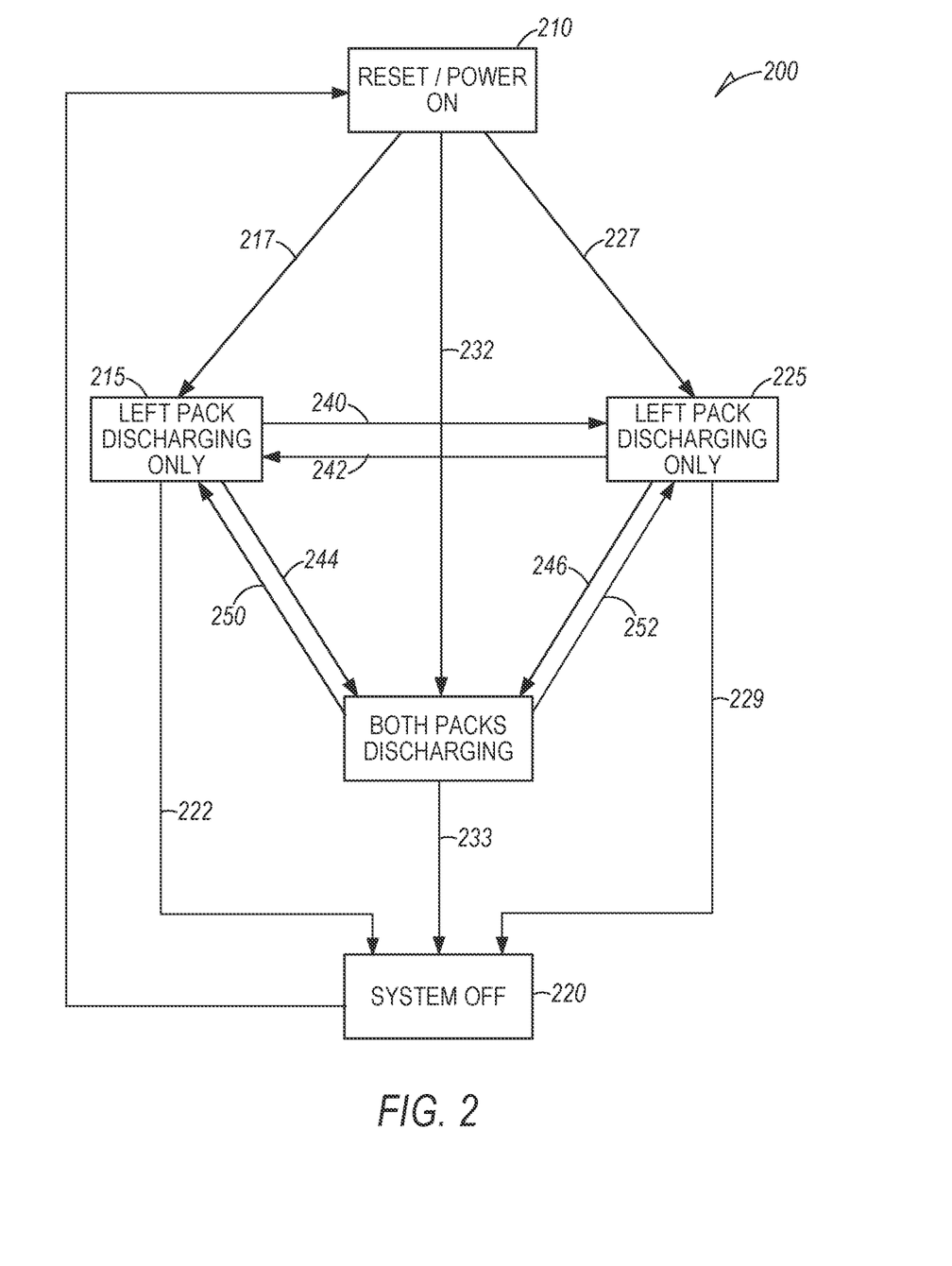
FIG. 2 is a discharge state diagram illustrating balancing performed in response to charge status information according to an example embodiment.

FIG. 2 is a discharge state diagram 200 illustrating balancing performed by the controller 185 via control of right and left load switches 130 and 135 in response to received remaining capacity information. Discharge state diagram 200 begins at power on state 210 with power being provided to controller 185.

In a left battery pack discharging only state 215, left battery pack 125 is in a discharge state entered by closing left load switch 135 and opening right load switch 130. State 210 transitions to state 215 as indicated at 217 in response to at least one of three conditions being met. Such conditions include only the left battery pack being attached with sufficient remaining capacity OR only the left battery pack has available remaining capacity, even if the right battery pack is attached OR the remaining capacity in the left battery pack is higher than the remaining capacity in the right battery pack by a remaining capacity threshold, $\Delta RM$. This last condition is expressed as RM_Left-RM_Right>$\Delta RM$. One example value for $\Delta RM$ may be around 2 percent or from 1 to 3 percent of total charge of a battery. The actual value may vary based on actual components used in order to optimize run time of system 100.

Left battery pack discharging only state 215 may transition to a system off state 220 as indicated at 222 in response to (the left battery pack becoming detached OR reaching a termination voltage) AND (the right battery pack becoming detached OR the right battery pack has no remaining capacity.)

In a right battery pack discharging only state 225, right battery pack 115 is in a discharge state entered by closing right load switch 130 and opening left load switch 135. State 210 transitions to state 225 as indicated at 227 in response to at least one of three conditions being met. Such conditions include only the right battery pack being attached with sufficient remaining capacity OR only the right battery pack has available remaining capacity, even if the left battery pack is attached OR the remaining capacity in the right battery pack is higher than the remaining capacity in the left battery pack by a remaining capacity threshold, $\Delta$RM. This last condition is expressed as RM_Right-RM_Left>$\Delta$RM.

Right battery pack discharging only state 215 may transition to a system off state 220 as indicated at 229 in response to (the right battery pack becoming detached OR reaching a termination voltage) AND (the left battery pack becoming detached OR the left battery pack has no remaining capacity.)

A both battery packs discharging state 230 may be entered from the power on state 210 as indicated at 232 in response to both battery packs being attached AND both battery packs having available charge AND the difference in remaining capacity in both is less than or equal to the remaining capacity threshold. This condition may be expressed as |RM_Right-RM_Left|<=$\Delta$RM. State 230 may progress to the system off state 220 as indicated at 233 in response to neither battery being able to provide power: (the left battery pack having no remaining capacity OR is detached) AND (the left battery pack having no remaining capacity OR is detached.)

In both battery packs discharging state 230, both packs are balanced (difference in RM is within the acceptable threshold $\Delta$RM_Max) and providing system power. Both the right and left load switches 130 and 135 are closed.

There are several other transitions between the states shown in FIG. 2 that may occur based on changes in the remaining capacity status information. For example, the left battery pack discharging only state 215 may transition to the right battery pack discharging only state 225 as indicated at 240 in response to the left battery pack being unable to provide sufficient power while the right battery pack has sufficient remaining capacity, or the right battery pack RM is higher than the left battery pack RM by the $\Delta$RM threshold. These conditions may be expressed as: ((the left batten pack is detached OR reaches termination voltage) AND (the right battery pack is attached AND has available remaining capacity)) OR ((the right battery pack is attached AND has available remaining capacity) AND (RM_Right-RM_Left>$\Delta$RM_Max)), Similarly, the right battery pack discharging only state 225 may transition to the left battery pack discharging only state 215 as indicated at 242 in response to the right battery pack being unable to provide sufficient power while the left battery pack has sufficient remaining capacity, or the left battery pack RM is higher than the right battery pack RM by the $\Delta$RM threshold. These conditions may be expressed as: ((the right battery pack is detached OR reaches termination voltage) AND (the left battery pack is attached AND has available remaining capacity)) OR ((the left battery pack is attached AND has available remaining capacity) AND (RM_Left-RM_Right>$\Delta$RM_Max)).

The left battery pack discharging only state 215 may transition to the both battery packs discharging state 230 as indicated at 244 in response to both battery packs having less of a remaining capacity difference. This condition may be expressed as: The right battery pack is attached AND the right battery pack has available remaining capacity AND |RM_Left-RM_Right|<$\Delta$RM_Allowed.

$\Delta$RM_Allowed is a second threshold that is commonly less than the $\Delta$RM_Max to prevent rapid oscillations between states about the $\Delta$RM_Max threshold. The $\Delta$RM_Allowed threshold may be system dependent and can be adjusted to prevent undesired oscillation in state changes.

Similarly, the right battery pack discharging only state 225 may transition to the both battery packs discharging state 230 as indicated at 246 in response to both battery packs having less of a remaining capacity difference. This condition may be expressed as: The left battery pack is attached AND the left battery pack has available remaining capacity AND |RM_Right-RM_Left|<$\Delta$RM_Allowed.

In the both battery packs discharging state 230, in addition to transitioning to the system off state in response to both packs reach termination or are detached simultaneously, then the system will lose power. State 230 can transition to only one of the battery packs discharging states as indicated at 250 and 252 in response to changes in the status information. Examples include one of the battery packs becoming detached or reaching a termination voltage while the other pack has sufficient remaining capacity, or the difference between remaining capacity exceeding $\Delta$RM_Max.

The conditions for transitioning from both battery packs discharging state 230 to left battery pack discharging only state 215 may be expressed as: ((Right battery pack is detached OR right battery pack reaches termination voltage) AND (left pack is attached AND has remaining capacity)) OR (RM_Left-RM_Right>$\Delta$RM_Max).

Similarly, the conditions for transitioning from both battery packs discharging state 230 to right battery pack discharging only state 225 may be expressed as: ((Left battery pack is detached OR left battery pack reaches termination voltage) AND (right pack is attached AND has remaining capacity)) OR (RM_Right-RM_Left>$\Delta$RM_Max).

Finally, the system off state 220 may transition back to power on state 210 in response to the either battery pack becoming attached with available sufficient remaining capacity. This condition may be expressed as: (Left battery pack is attached AND has available remaining capacity) OR (right battery pack is attached AND has available remaining capacity).

Figure 3:
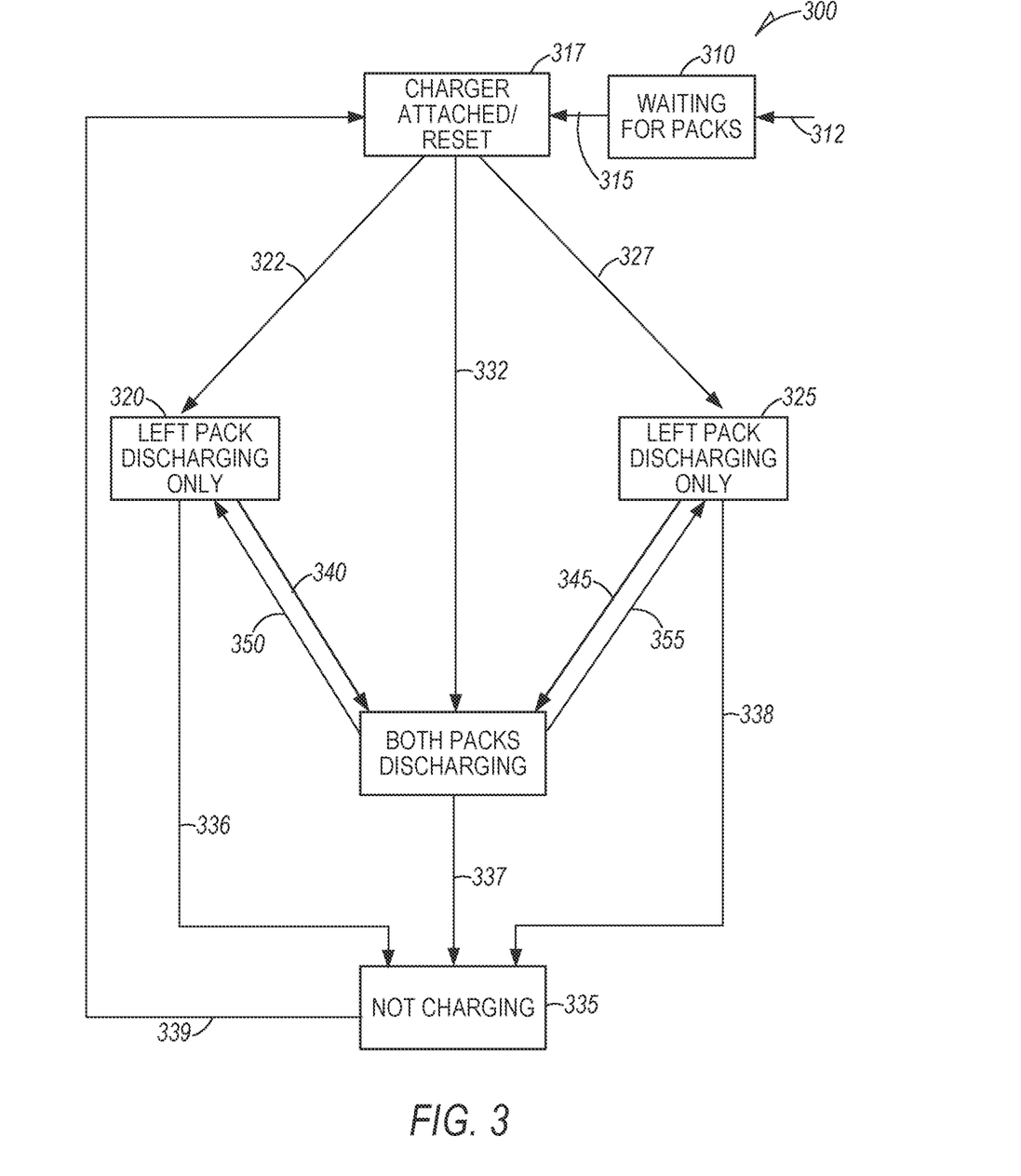
FIG. 3 is a charging state diagram that illustrates various states and transitions between states while a charger is available to provide charge to attached battery packs according to an example embodiment.

FIG. 3 is a charging state diagram 300 that illustrates various states and transitions between states while a charger is available to provide charge to attached battery packs. The charging states may exist in parallel with the discharging states. A waiting for packs state 310 is entered from all other states as indicated at 312 in response to both battery packs being detached AND an in-use charging cable being attached. At a transition 315, at least one battery pack is detected as being attached, resulting in entering a charger attached/reset state 317.

In response to only the left battery pack being attached OR in the event both battery packs are attached but RM_Right-RM_Left>$\Delta$RM_Max, a left battery pack charging only state 320 is entered from state 317 as indicated at transition 322. Similarly, in response to only the right battery pack being attached OR in the event both battery packs are attached but RM_Left-RM_Right>$\Delta$RM_Max, a right battery pack charging only state 325 is entered from state 317 as indicated at transition 327.

If both battery packs are attached AND |RM_Right-RM_Left|<=ΔRM_Max, a both battery packs charging state 330 is entered from state 317 as indicated by transition 332. A not charging state 335 may be entered from any of states 320, 325, and 330 as indicated at transitions 336, 337, 338 in response to the in-use charging cable being detached AND at least one pack being attached. No battery pack is being charged in state 335. If the in-use Charging cable becomes attached in this state AND at least one pack is still attached, the state transitions at 339 back to charger attached/reset state 317.

Other state transitions may occur between the both battery packs charging state 330 and the left and right battery packs charging states 320 as indicated in transitions 340, 345, 350, and 355. The Left battery pack charging state 320 transitions at 340 to the both battery packs charging state 320 in response to the right battery pack being attached AND |RM_Right-RM_Left|<ΔRM_Allowed. Similarly, the Right battery pack charging state 325 transitions at 345 to the both battery packs charging state 320 in response to the left battery pack being attached AND |RM_Left-RM_Right|<ΔRM_Allowed. In other words, both battery packs will be charging if the remaining capacities are fairly balanced.

Still further state transitions may occur from the both battery packs charging state 330 to one of the left and right battery packs charging states 320 and 325 in response to one pack being detached, or the difference in remaining capacity exceeding ΔRM_Max, meaning that the remaining capacities are too far out of balance, and one battery pack needs charging more than the other battery pack. The transition from both battery packs charging state to the left battery pack charging only state 320 via transition 350 occurs in response to (the right battery pack becoming detached AND the left battery pack is attached) OR (RM_Right-RM_Left>ΔRM_Max). The transition from both battery packs charging state to the right battery pack charging only state 325 via transition 355 occurs in response to (the left battery pack becoming detached AND the right battery pack is attached) OR (RM_Left-RM_Right>ΔRM_Max).

The use of both multiple discharging and charging states also provides the ability to continue operating while swapping an external battery. Batteries may also be balanced in terms of remaining capacity. In one example, all states (charging and discharging) are designed to equalize remaining battery or balance life. The terms balancing and equalizing are not meant to require exact balance in remaining life, but that the control of charging and discharging by transitioning in states keeps the remaining capacity of the batteries within or close to the selected threshold levels. Lower thresholds may keep the remaining capacities closer. The thresholds may be adjusted to prevent undesired oscillations between states, referred to as hysteresis.

Figure 4:
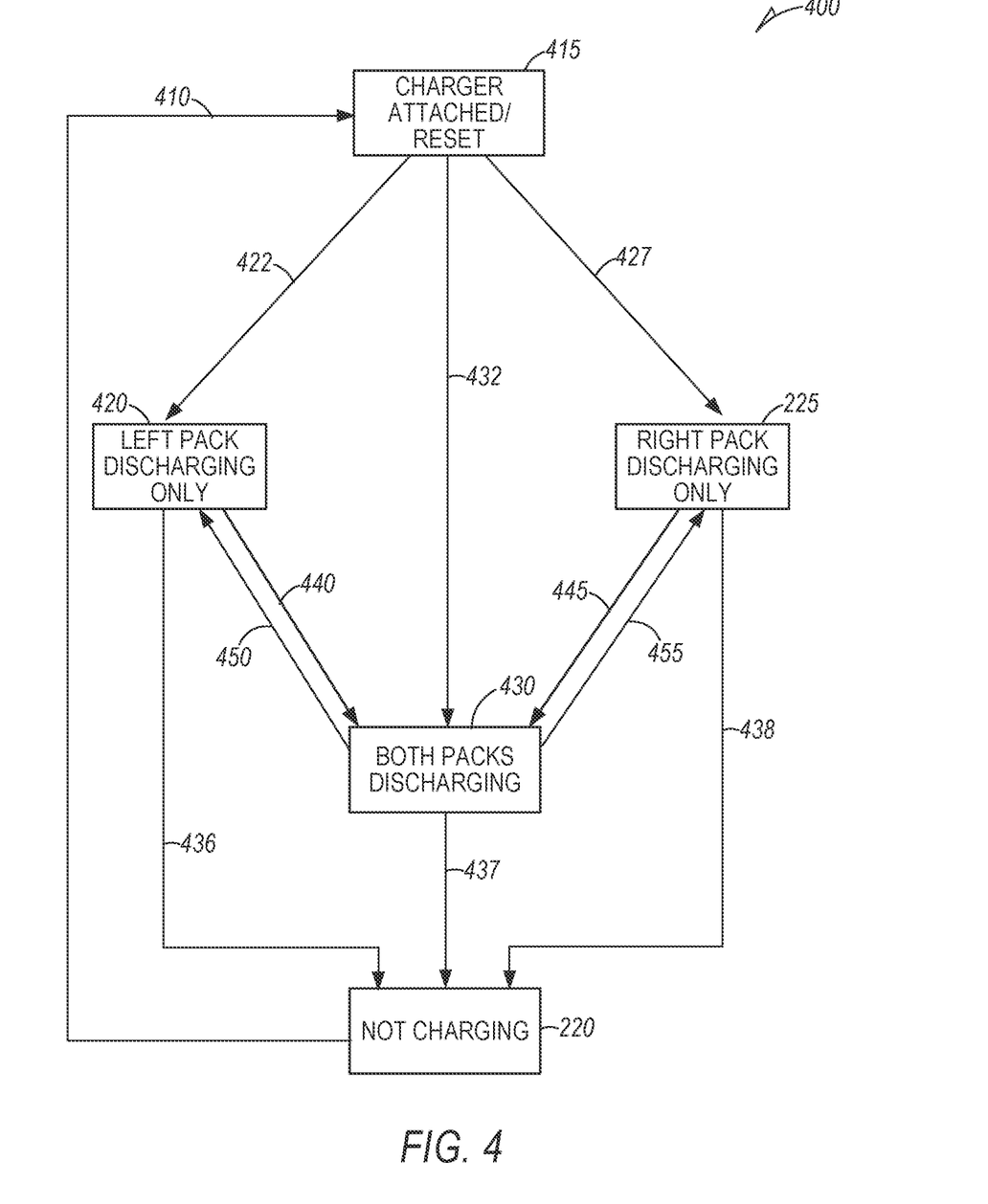
FIG. 4 is a charging state diagram that illustrates various states and transitions between states while a charger is connected directly to one of the battery packs according to an example embodiment.

FIG. 4 is a charging state diagram 400 that illustrates various states and transitions between states while a charger is connected directly to one of the battery packs, in this case, the left battery pack. The charging states may exist in parallel with the discharging states. A transition 410 to a charger attached/reset state 415 occurs in response to an in-use charging cable is connected to an attached left battery pack.

In response to only the left battery pack being attached OR in the event both battery packs are attached but RM_Right-RM_Left>ΔRM_Max, a left battery pack charging only state 420 is entered from state 415 as indicated at transition 422. Similarly, in response to both battery packs being attached AND RM_Left-RM_Right>ΔRM_Max, a right battery pack charging only state 425 is entered from state 415 as indicated at transition 427.

If both battery packs are attached AND |RM_Right-RM_Left|<=ΔRM_Max, a both battery packs charging state 430 is entered from state 415 as indicated by transition 432. A not charging state 435 may be entered from any of states 420, 425, and 430 as indicated at transitions 436, 437, 438 in response to (the in-use charging cable being detached AND at least one pack being attached) OR (left battery pack is detached). No battery pack is being charged in state 335. If the in-use charging cable becomes attached to the left battery pack in this state AND the left batter pack is still attached, the state transitions at 410 back to charger attached/reset state 415.

Other state transitions may occur between the both battery packs charging state 430 and the left and right battery packs charging states 420 as indicated in transitions 440, 445, 450, and 455. The Left battery pack charging state 420 transitions at 440 to the both battery packs charging state 420 in response to the right battery pack being attached AND |RM_Right-RM_Left|<ΔRM_Allowed. Similarly, the right battery pack charging state 425 transitions at 445 to the both battery packs charging state 420 in response to the left battery pack being attached AND |RM_Left-RM_Right|<ΔRM_Allowed. In other words, both battery packs will be charging if the remaining capacities are fairly balanced and both battery packs are still attached.

Still further state transitions may occur from the both battery packs charging state 430 to one of the left and right battery packs charging states 420 and 425 in response to the right pack being detached, or if the difference in remaining capacity exceeds ΔRM_Max, meaning that the remaining capacities are too far out of balance, and one battery pack needs charging more than the other battery pack. The transition from both battery packs charging state to the left battery pack charging only state 420 via transition 450 occurs in response to (the right battery pack becoming detached OR (RM_Right-RM_Left>ΔRM_Max). The transition from both battery packs charging state to the right battery pack charging only state 425 via transition 455 occurs in response to (RM_Left-RM_Right>ΔRM_Max).

Figure 5:
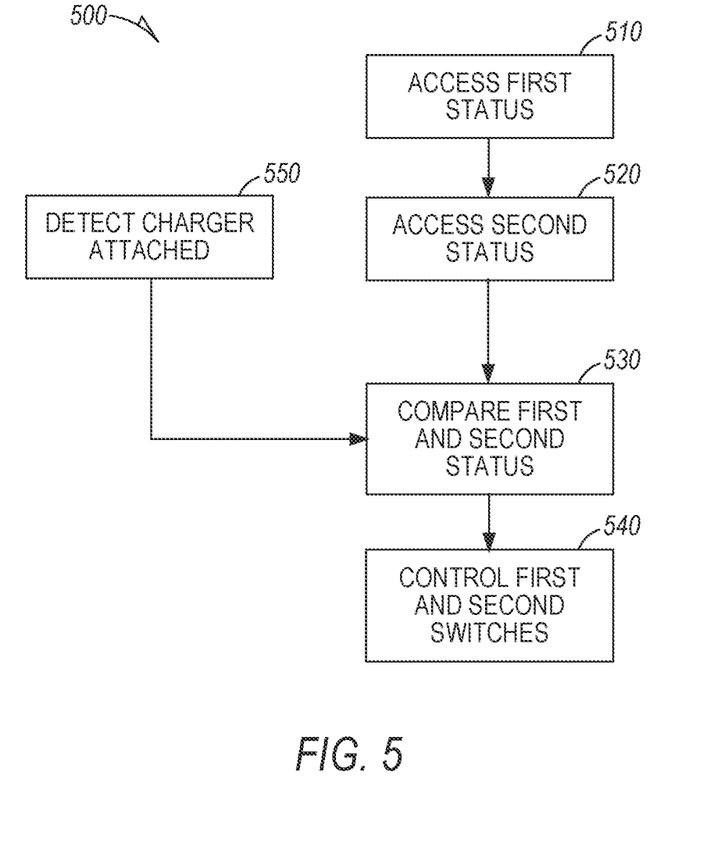
FIG. 5 is a flowchart illustrating a computer implemented method for controlling remaining capacity in multiple battery packs that may be used to power one or more loads according to an example embodiment.

FIG. 5 is a flowchart illustrating a computer implemented method 500 for controlling remaining capacity in multiple battery packs that may be used to power one or more loads and other circuitry, such as a found in head mounted devices. Method 500 begins at operation 510 by accessing a first status of a first battery pack interface coupled to a load via a first load switch. A second status of a second battery pack interface coupled to the load via a second load switch is also accessed at operation 520. Accessing may include receiving one or more signals representative of status at a controller from battery packs, polling the battery packs, or accessing a storage location for the status. Battery pack interfaces may include a switch that changes state in response to a battery pack being attached or not. The status of the switch may be detected or accessed to provide status.

At operation 530, the first status and the second status are compared, and at operation 540, the first and second load switches are selectively controlled to be on or off based on the comparing. Controlling the first and second switches may be performed to balance remaining capacity in the first and second battery packs by controlling discharge and charging of the first and second battery packs.

Controlling discharge may be performed independent of controlling charging. In one example, a battery pack is either charging or discharging but not both. If the charger is attached to the charger input, the system transitions to the reset state of the charging state machine (and operates in the charging state machine from there). If the charger is detached from the system, the system will transition to the reset state of the discharging state machine and operate in the discharging state machine from there.

In one example, each of the first status the second status include a representation of a remaining capacity of first and second battery packs attached to respective first and second battery pack interfaces. Controlling the first and second load switches may be performed to balance remaining capacities of the first and second battery packs.

Comparing the first status and the second status at operation 530 may include calculating a difference in the remaining capacities compared to a maximum remaining capacity difference threshold, $\Delta RM\_Max$. The first and second load switches may be controlled to discharge one or both of the first and second battery packs as a function of an allowed difference threshold $\Delta RM\_Allowed$, wherein $\Delta RM\_Max$ is greater than $\Delta RM\_Allowed$.

In a further example, the first status and the second status include a representation of attachment of the respective first and second battery packs to the first and second battery pack interfaces. The representations of attachment facilitate control of first and second load switches to discharge one or both of the first and second battery packs as a function the representations of attachment and of the allowed difference threshold $\Delta RM\_Allowed$.

Method 500 may also include detecting that a charger is attached at operation 550. An indication of the charger being attached may be added to or included with the first and second status. Operation 540 may include controlling the first and second load switches to selectively charge the first and second battery packs as function of the first status and the second status, including an indication that a charger is attached. The first and second load switches are controlled to selectively charge the first and second battery packs as a function of the difference in the remaining capacity compared to a charging maximum remaining capacity difference threshold. The switches may be controlled to selectively charge one or both of the first and second battery packs as a function of an allowed difference in remaining capacity threshold, wherein the charging maximum remaining capacity difference threshold is greater than the allowed difference in remaining capacity threshold. In various examples, the charging and discharging maximum capacity and allowed difference in remaining capacity may be same or different for charging and discharging.

Figure 6:
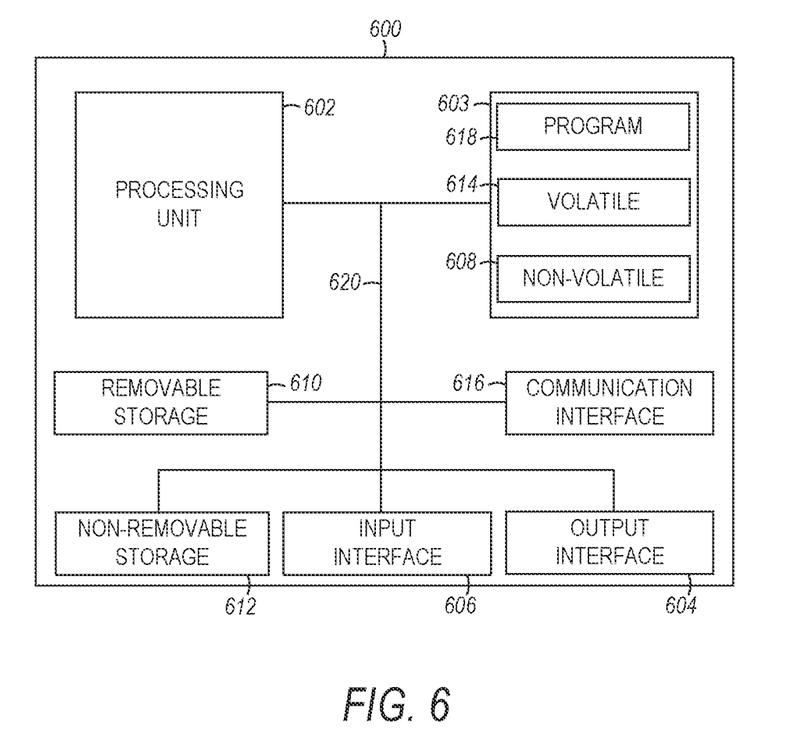
FIG. 6 is a block schematic diagram of a computer system to implement one or more example embodiments.

FIG. 6 is a block schematic diagram of a computer system 600 to implement controller 185 and for performing methods and algorithms according to example embodiments. All components need not be used in various embodiments, such as in battery packs and chargers.

One example computing device in the form of a computer 600 may include a processing unit 602, memory 603, removable storage 610, and non-removable storage 612. Although the example computing device is illustrated and described as computer 600, the computing device may be in different forms in different embodiments. For example, the computing device may instead be a smartphone, a tablet, smartwatch, smart storage device (SSD), or other computing device including the same or similar elements as illustrated and described with regard to FIG. 6. Devices, such as smartphones, tablets, and smartwatches, are generally collectively referred to as mobile devices or user equipment.

Although the various data storage elements are illustrated as part of the computer 600, the storage may also or alternatively include cloud-based storage accessible via a network, such as the Internet or server-based storage. Note also that an SSD may include a processor on which the parser may be run, allowing transfer of parsed, filtered data through I/O channels between the SSD and main memory.

Memory 603 may include volatile memory 614 and non-volatile memory 608. Computer 600 may include—or have access to a computing environment that includes—a variety of computer-readable media, such as volatile memory 614 and non-volatile memory 608, removable storage 610 and non-removable storage 612. Computer storage includes random access memory (RAM), read only memory (ROM), erasable programmable read-only memory (EPROM) or electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions.

Computer 600 may include or have access to a computing environment that includes input interface 606, output interface 604, and a communication interface 616. Output interface 604 may include a display device, such as a touchscreen, that also may serve as an input device. The input interface 606 may include one or more of a touchscreen, touchpad, mouse, keyboard, camera, one or more device-specific buttons, one or more sensors integrated within or coupled via wired or wireless data connections to the computer 600, and other input devices. The computer may operate in a networked environment using a communication connection to connect to one or more remote computers, such as database servers. The remote computer may include a personal computer (PC), server, router, network PC, a peer device or other common data flow network switch, or the like. The communication connection may include a Local Area Network (LAN), a Wide Area Network (WAN), cellular, Wi-Fi, Bluetooth, or other networks. According to one embodiment, the various components of computer 600 are connected with a system bus 620.

Computer-readable instructions stored on a computer-readable medium are executable by the processing unit 602 of the computer 600, such as a program 618. The program 618 in some embodiments comprises software to implement one or more methods described herein. A hard drive, CD-ROM, and RAM are some examples of articles including a non-transitory computer-readable medium such as a storage device. The terms computer-readable medium, machine readable medium, and storage device do not include carrier waves or signals to the extent carrier waves and signals are deemed too transitory. Storage can also include networked storage, such as a storage area network (SAN). Computer program 618 along with the workspace manager 622 may be used to cause processing unit 602 to perform one or more methods or algorithms described herein.

EXAMPLES

A computer implemented method includes accessing a first status of a first battery pack interface coupled to a load via a first load switch and accessing a second status of a second battery pack interface coupled to the load via a second load switch. The first status and the second status are compared and the first and second load switches are controlled based on the comparing to balance remaining capacities of the first and second battery packs.

2. The method of example 1 wherein the first status and the second status include a representation of a remaining capacity of respective first and second battery packs attached to respective first and second battery pack interfaces.
3. The method of example 2 wherein comparing the first status and the second status includes calculating a difference in the remaining capacities and comparing the difference in the remaining capacities to a maximum remaining capacity difference threshold, $\Delta RM\_Max$.
4. The method of example 3 wherein controlling the first and second load switches includes controlling the first and second load switches to discharge one or both of the first and second battery packs as a function of an allowed difference threshold $\Delta RM\_Allowed$, wherein $\Delta RM\_Max$ is greater than $\Delta RM$ Allowed.
5. The method of any of examples 2-4 wherein the first status and the second status include a representation of attachment of the respective first and second battery packs to the first and second battery pack interfaces.
6. The method of example 5 wherein controlling the first and second load switches includes controlling the first and second load switches to discharge one or both of the first and second battery packs as a function of the representations of attachment and of an allowed difference threshold $\Delta RM\_Allowed$, wherein $\Delta RM\_Max$ is greater than $\Delta RM\_Allowed$.
7. The method of any of examples 1-6 and further including detecting that a charger is attached and controlling the first and second load switches to selectively charge the first and second battery packs as function of the first status and the second status.
8. The method of example 7 wherein the first and second load switches are controlled to selectively charge the first and second battery packs as a function of a difference in the remaining capacities compared to a charging maximum remaining capacity difference threshold.
9. The method of example 8 wherein controlling the first and second load switches includes controlling the first and second load switches to selectively charge one or both of the first and second battery packs as a function of an allowed difference in remaining capacity threshold, wherein the charging maximum remaining capacity difference threshold is greater than the allowed difference in remaining capacity threshold.
10. The method of any of examples 7-9 wherein controlling the first and second switches is performed to balance remaining capacity in the first and second battery packs by controlling discharge and charging of the first and second battery packs.
11. The method of example 10 wherein controlling discharge is performed independent of controlling charging.
12. A system includes a first battery pack interface for attaching a first battery pack, a second battery pack interface for attaching a second battery pack, a first load switch coupled between the first battery pack interface and a load, a second load switch coupled between the second battery pack interface and the load, and a controller coupled to receive a first status of the first battery pack interface and a second status of the second battery pack interface, compare the first status and the second status, control the first and second load switches based on the comparing to balance remaining capacities of the first and second battery packs.
13. The system of example 12 wherein the first status and the second status include a representation of a remaining capacity of respective first and second battery packs attached to respective first and second battery pack interfaces.
14. The system of example 13 wherein the controller compares the first status and the second status by calculating a difference in the remaining capacities and comparing the difference to a maximum remaining capacity difference threshold, $\Delta RM\_Max$ and wherein the controller controls the first and second load switches to discharge one or both of the first and second battery packs as a function of an allowed difference threshold $\Delta RM\_Allowed$, wherein $\Delta RM\_Max$ is greater than $\Delta RM\_Allowed$.
15. The system of example 14 wherein the first status and the second status include a representation of attachment of the respective first and second battery packs to the first and second battery pack interfaces and wherein the controller controls the first and second load switches to selectively charge the first and second battery packs as function of the first status and the second status.
16. The system of example 15 wherein the first and second load switches are controlled to selectively charge the first and second battery packs as a function of the difference in the remaining capacities compared to a charging maximum remaining capacity difference threshold and as a function of an allowed difference in remaining capacity threshold, wherein the charging maximum remaining capacity difference threshold is greater than the allowed difference in remaining capacity threshold.
17. The system of any of examples 12-16 wherein the controller controls the first and second switches is performed to balance remaining capacity in the first and second battery packs by controlling discharge and charging of the first and second battery packs.
18. The system of example 17 wherein the controller controls discharge independent of controlling charging.
19. The system of any of examples 12-18 wherein the controller is configured to balance remaining capacity of attached first and second battery packs in response to one of the first and second battery packs being removed and replaced with a third, different, battery pack.
20. A machine-readable storage device has instructions for execution by a processor of a machine to cause the processor to perform operations to perform a method. The operations include accessing a first status of a first battery pack interface coupled to a load via a first load switch, accessing a second status of a second battery pack interface coupled to the load via a second load switch, comparing the first status and the second status, and controlling the first and second load switches based on the comparing to balance remaining capacities of the first and second battery packs.

Although a few embodiments have been described in detail above, other modifications are possible. For example, the logic flows depicted in the figures do not require the particular order shown, or sequential order, to achieve desirable results. Other steps may be provided, or steps may be eliminated, from the described flows, and other components may be added to, or removed from, the described systems. Other embodiments may be within the scope of the following claims.

The invention claimed is:
1. A computer implemented method comprising:
accessing a first status of a first battery pack interface coupled to a load via a first load switch;

accessing a second status of a second battery pack interface coupled to the load via a second load switch wherein the first status and the second status include a representation of a remaining capacity of respective first and second battery packs attached to respective first and second battery pack interfaces;

comparing the first status and the second status by calculating a difference in the remaining capacities; and controlling the first and second load switches based on the difference in the remaining capacities to balance remaining capacities of the first and second battery packs.

2. The method of claim 1 wherein controlling the first and second load switches is based on comparing the difference in the remaining capacities to a maximum remaining capacity difference threshold, $\Delta RM\_Max$.

3. The method of claim 2 wherein controlling the first and second load switches comprises controlling the first and second load switches to discharge one or both of the first and second battery packs as a function of an allowed difference threshold $\Delta RM\_Allowed$, wherein $\Delta RM\_Max$ is greater than $\Delta RM\_Allowed$.

4. The method of claim 1 wherein the first status and the second status include a representation of attachment of the respective first and second battery packs to the first and second battery pack interfaces.

5. The method of claim 4 wherein controlling the first and second load switches comprises controlling the first and second load switches to discharge one or both of the first and second battery packs as a function the representations of attachment and of an allowed difference threshold $\Delta RM\_Allowed$, wherein $\Delta RM\_Max$ is greater than $\Delta RM\_Allowed$.

6. The method of claim 1 and further comprising:
detecting that a charger is attached; and
controlling the first and second load switches to selectively charge the first and second battery packs as function of the first status and the second status.

7. The method of claim 6 wherein the first and second load switches are controlled to selectively charge the first and second battery packs as a function of a difference in the remaining capacities compared to a charging maximum remaining capacity difference threshold.

8. The method of claim 7 wherein controlling the first and second load switches comprises controlling the first and second load switches to selectively charge one or both of the first and second battery packs as a function of an allowed difference in remaining capacity threshold, wherein the charging maximum remaining capacity difference threshold is greater than the allowed difference in remaining capacity threshold.

9. The method of claim 6 wherein controlling the first and second switches is performed to balance remaining capacity in the first and second battery packs by controlling discharge and charging of the first and second battery packs.

10. The method of claim 9 wherein controlling discharge is performed independent of controlling charging.

11. A system comprising:
a first battery pack interface for attaching a first battery pack;
a second battery pack interface for attaching a second battery pack;
a first load switch coupled between the first battery pack interface and a load;
a second load switch coupled between the second battery pack interface and the load; and
a controller coupled to receive a first status of the first battery pack interface and a second status of the second battery pack interface, wherein the first status and the second status include a representation of a remaining capacity of respective first and second battery packs, compare the first status and the second status by calculating a difference in the remaining capacities, and control the first and second load switches based on the difference in the remaining capacities to balance remaining capacities of the first and second battery packs.

12. The system of claim 11 wherein the controller controls the first and second load switches by comparing the difference to a maximum remaining capacity difference threshold, $\Delta RM\_Max$ and wherein the controller controls the first and second load switches to discharge one or both of the first and second battery packs as a function of an allowed difference threshold $\Delta RM\_Allowed$, wherein $\Delta RM\_Max$ is greater than $\Delta RM\_Allowed$.

13. The system of claim 12 wherein the first status and the second status include a representation of attachment of the respective first and second battery packs to the first and second battery pack interfaces and wherein the controller controls the first and second load switches to selectively charge the first and second battery packs as function of the first status and the second status.

14. The system of claim 13 wherein the first and second load switches are controlled to selectively charge the first and second battery packs as a function of the difference in the remaining capacities compared to a charging maximum remaining capacity difference threshold and as a function of an allowed difference in remaining capacity threshold, wherein the charging maximum remaining capacity difference threshold is greater than the allowed difference in remaining capacity threshold.

15. The system of claim 11 wherein the controller controls the first and second switches to balance remaining capacity in the first and second battery packs by controlling discharge and charging of the first and second battery packs.

16. The system of claim 15 wherein the controller controls discharge independent of controlling charging.

17. The system of claim 11 wherein the controller is configured to balance remaining capacity of attached first and second battery packs in response to one of the first and second battery packs being removed and replaced with a third, different, battery pack.

18. A machine-readable storage device having instructions for execution by a processor of a machine to cause the processor to perform operations to perform a method, the operations comprising:
accessing a first status of a first battery pack interface coupled to a load via a first load switch;
accessing a second status of a second battery pack interface coupled to the load via a second load switch wherein the first status and the second status include a representation of a remaining capacity of respective first and second battery packs attached to respective first and second battery pack interfaces;
comparing the first status and the second status by calculating a difference in the remaining capacities; and
controlling the first and second load switches based on the difference in the remaining capacities to balance remaining capacities of the first and second battery packs.

* * * * *